United States Patent
Park

(10) Patent No.: US 6,438,525 B1
(45) Date of Patent: *Aug. 20, 2002

(54) SCALABLE AUDIO CODING/DECODING METHOD AND APPARATUS

(75) Inventor: Sung-hee Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/612,630

(22) Filed: Jul. 7, 2000

Related U.S. Application Data

(62) Division of application No. 08/978,877, filed on Nov. 26, 1997.

(30) Foreign Application Priority Data

Apr. 2, 1997 (KR) ............................................. 97-12232
Nov. 19, 1997 (KR) ............................................. 97-61298

(51) Int. Cl.⁷ ............................................. G10L 19/00
(52) U.S. Cl. ..................................... 704/500; 704/230
(58) Field of Search .............................. 704/500, 501, 704/503, 229, 230, 222

(56) References Cited

U.S. PATENT DOCUMENTS

| | | |
|---|---|---|
| 5,109,417 A | 4/1992 | Fielder et al. |
| 5,367,608 A | 11/1994 | Veldhuis et al. |
| 5,495,298 A | 2/1996 | Uchida et al. |
| 5,511,094 A | 4/1996 | Lee et al. |
| 5,555,273 A | 9/1996 | Ishino |
| 5,592,584 A | 1/1997 | Ferreira et al. |
| 5,632,005 A * | 5/1997 | Davis et al. ................. 704/500 |
| 5,649,053 A | 7/1997 | Kim |
| 5,732,391 A | 3/1998 | Fiocoa |
| 5,835,030 A | 11/1998 | Tsutsui et al. |
| 5,852,805 A * | 12/1998 | Hiratsuka et al. ........... 704/500 |
| 6,016,111 A * | 1/2000 | Park ............................ 341/55 |
| 6,122,618 A * | 9/2000 | Park ........................... 704/500 |
| 6,148,288 A * | 11/2000 | Park ........................... 704/500 |
| 6,349,284 B1 * | 2/2002 | Park et al. ................... 704/230 |

OTHER PUBLICATIONS

Tang, Benjamim et al.; A Perceptually Based Embedded Subband Speech Coder; IEEE Transactions on Speech and Audio Processing, vol. 5, No. 2, pp. 131–140; Mar. 1997.*
Nelson, Mark; Part 1–Arthmetic Coding; Dr. Dobb's Journal; pp. 1–11; Feb. 1991.*

(List continued on next page.)

Primary Examiner—Tālivaldis Ivars Šmits
Assistant Examiner—Abul K. Azad
(74) Attorney, Agent, or Firm—Burns, Doane, Swecker & Mathis, L.L.P.

(57) ABSTRACT

A scalable audio coding/decoding method and apparatus are provided. The coding method includes the steps of (a) signal-processing input audio signals and quantizing the same for each predetermined coding band, (b) coding the quantized data corresponding to the base layer within a predetermined layer size, (c) coding the quantized data corresponding to the next enhancement layer of the coded base layer and the remaining quantized data uncoded and belonging to the enhancement layer, within a predetermined layer size, and (d) sequentially performing the layer coding steps for all layers, wherein the steps (b), (c) and (d) each include the steps of (e) representing the quantized data corresponding to a layer to be coded by digits of a predetermined same number, and (f) coding the most significant digit sequences composed of most significant digits of the magnitude data composing the represented digital data. The method can accommodate various users' request and transmission channels, and the complexity of the encoder and decoder can be reduced. Also, according to the performance of decoders or bandwidth/congestion of transmission channels or by users' request, the bitrate or complexity can be controlled.

20 Claims, 4 Drawing Sheets

OTHER PUBLICATIONS

D. Pan, "An Overview of the MPEG/Audio Compression Algorithm," *Proceedings of the SPIE, US SPIE*, Bellingham, VA, vol. 2187, XP 0005171198, pp. 260–273.

A. Jain et al., "Scalable Compression For Image Browing," *IEEE Transactions on Consumer Electronics, US, IEEE Inc.*, New York, vol. 40, No. 3, XP 000471199, pp. 394–403.

B. Grill et al., MPEG 5 Technical description, Contribution of University of Erlangen/FhG–IIS.

Brandenburg et al., ISO–MPEG–1 Audio: A Generic Standard for Coding of High–Quality Digital Audio, $92^{nd}$ Convention of the Audio Engineering Society, Vienna, Austria.

D. Seitzer et al., Digital Coding of High Quality Audio, $5^{th}$ Annual European Computer Conference, pp. 148–154.

van der Waal et al., Current and future Standardization of high–quality digital audio coding in MPEG, Applications of Signal Processing to Audio and Acoustis, pp. 43–46.

Bernard Sklar, Digital Communications Fundamentals and Applications, pp. 657–660.

Lawrence R. Rabinar, Digital processing of Speech Signals, pp. 179–186.

Allen Gersho, Vector Quantization and Signal Compression pp. 259–285.

MacInnis, MPEG Systems Committee Draft–ISO/IEC JTC1/SC2/WG11, Compcon Spring '91, pp. 338–339.

\* cited by examiner

SCALABLE AUDIO CODING/DECODING METHOD AND APPARATUS

This application is a division of Ser. No. 08/978,877 Nov. 26, 1997.

BACKGROUND OF THE INVENTION

1. Field of the Invention

The present invention relates to audio coding and decoding, and more particularly, to a scalable audio coding/decoding method and apparatus, for coding/decoding layered bitstreams this invention has been adopted in ISO/IEC JTC1/SC29/WG11 N1903 (ISO/IEC 14496-3 SUBPART 4 Committee Draft), by representing data of various enhancement layers, based on a base layer, within a bitstream.

2. Description of the Related Art

In general, a waveform including information is basically a continuous analog signal. To express the waveform as a discrete signal, analog-to-digital (A/D) conversion is necessary.

To perform the A/D conversion, two procedures are necessary: 1) a sampling procedure for converting a temporally continuous signal into a discrete signal; and 2) an amplitude quantizing procedure for limiting the number oaf possible amplitudes to a limited value, that is to say, for converting input amplitude x(n) into an element y(n) belonging to a finite set of possible amplitudes at time n.

By the recent development of digital signal processing technology, an audio signal storage/restoration method for converting an analog signal into digital PCM (Pulse Code Modulation) data through sampling and quantization, storing the converted signal in a recording/storage medium such as a compact disc or digital audio tape and then reproducing the stored signal upon a user's need, has been proposed and widely used. The digital storage/restoration method solves deterioration in audio quality and considerably improves the audio quality, in contrast to the conventional analog method. However, this method still has a problem in storing and transmitting data in the case of a large amount of digital data.

To reduce the amount of the digital data, DPCM (Differential Pulse Code Modulation) or ADPCM (Adaptive Differential Pulse Code Modulation) for compressing digital audio signal has been developed. However, such a method have a disadvantage in that a big difference in efficiency is generated according to signal types. An MPEG (Moving Picture Expert Group)/audio technique recently standardized by the ISO (International Standard Organization), and AC-2/AC-3 techniques developed by Dolby, use a human psychoacoustic model to reduce the quantity of data.

In the conventional audio signal compressing method such as MPEG-1/audio, MPEG-2/audio or AC-2/AC-3, signals of a temporal domain are converted into signals of a frequency domain by being coupled by blocks having constant magnitude. Then, the converted signals are scala-quantized using the human psychoacoustic model. The quantizing technique is simple but is not optimal even if input samples are statistically independent. Further, if input samples are dependant statistically denpendent from one another, the quantization is more inappropriate. Thus, coding is performed, including lossless coding such as entropy coding or a certain kind of adaptive quantization. Therefore, consequently the coding procedure becomes very complex, compared to the simple PCM data storing method. A bitstream includes side information for compressing signals as well as the quantized PCM data.

The MPEG/audio standards or AC-2/AC-3 method provide almost the same audio quality as that for a compact disc, with a bitrate of 64–384 Kbps which is one-sixth to one-eighth that in the conventional digital coding. By for this reason, MPEG/audio standards play an important role in storing and transmitting audio signals as in digital audio broadcasting (DAB), Internet phone, or audio on demand (AOD).

In the conventional techniques, a fixed bitrate is given in an encoder, and the optimal state suitable for the given bitrate is searched to then perform quantization and coding, thereby exhibiting considerably better efficiency. However, with the advent of multimedia technology, there are increasing demands for coder/decoder (codec) having versatile functions with low bitrate coding efficiency. One of such demands is a scalable audio codec. The scalable audio codec can make the bitstreams coded at a high bitrate into low bitrate bitstreams to then restore only some of them. By doing so, signals can be restored with a reasonable efficiency with only some of the bitstreams, exhibiting a slight deterioration in performance a little due to lowered bitrates, when an overload is applied to the network or the performance of a decoder is poor, or by a user's request.

According to general audio coding techniques, a fixed bitrate is given to a coding apparatus, the optimal state for the given bitrate is searched to then perform quantization and coding, thereby forming bitstreams in accordance with the bitrate. One bitstream contains information only for one bitrate. In other words, bitrate information is contained in the header of a bitstream and a fixed bitrate is used. Thus, a method exhibiting the best efficiency at a specific bitrate can be ;used. For example, when a bitstream is formed by an encoder at a bitrate of 96 Kbps, the best quality sound can be restored by a decoder corresponding to the encoder having a bitrate of 96 Kbps.

According to such methods, bitstreams are formed without consideration of other bitrates, but bitstreams having a magnitude suitable for a given bitrate, rather than the order of the bitstreams, are formed. Actually, if the thus-formed bitstreams are transmitted via a communications network, the bitstreams are sliced into several slots to then be transmitted. When an overload-is applied to a transmission channel, or only some of the slots sent from a transmission end are received at a reception end due to a narrow bandwidth of the transmission channel, data cannot be reconstructed properly. Also, since bitstreams are not formed according to the significance thereof, if only some of the bitstreams are restored, the quality is severely degraded. In the case of audio digital data, sound objectionable to the ear is reproduced.

For example, when a broadcasting station forms bitstreams and transmits the same to various users, different bitrates may be requested by the users. The users may have decoders of different efficiencies. In such a case, if only the bitstreams supported by a fixed bitrate are transmitted from the broadcasting station to meet the users' request, the bitstreams be transmitted separately to the respective users, which is costly much in transmission and formation of bitstreams.

However, if an audio bitstream has bitrates of various layers, it is possible to meet the various users' request and given environment appropriately. To this end, simply, coding is performed on lower layers, as shown in FIG. 1, and then decoding is performed. Then, a difference between the signal obtained by decoding and the original signal is again input to an encoder for the next layer to When be processed. In other words, the base layer is coded first to generate a bitstream and then a difference between the original signal and the coded signal is coded to generate a bitstream of the next layer, which is repeated. This method increases the complexity of the encoder. Further, to restore the original signal, a decoder also repeats this procedure in a reverse order, which increases the complexity of the decoder. Thus, as the number of layers increases, the encoder and decoder become more complex.

SUMMARY OF THE INVENTION

To solve the above problems, it is an object of the present invention to provide a scalable audio coding/decoding method and apparatus, which can control the magnitude of bitstreams and the complexity of a decoder, according to the state of a transmission channel, the performance of the decoder or a user's request, by representing data for bitrates of various layers in a bitstream.

To accomplish the object, there is provided a scalable audio coding method for coding audio signals into a layered datastream having a base layer and enhancement layers of a predetermined number, comprising he steps of: (a) signal-processing input audio signals and quantizing the same for each predetermined coding band; (b) coding the quantized data corresponding to the base layer within a predetermined layer size; (c) coding the quantized data corresponding to the next enhancement layer of the coded base layer and the remaining quantized data uncoded and belonging to the enhancement layer, within a predetermined layer size; and (d) sequentially performing the layer coding steps for all layers, wherein the steps (b), (c) and (d) each comprise the steps of: (e) representing the quantized data corresponding to a layer to be coded by digits of a predetermined same number; and (f) coding the most significant digit sequences composed of most significant digits of the magnitude data composing the represented digital data.

The steps (e) and (f) are performed sequentially from low frequency to high frequency.

The coding steps (b), (c) and (d) are performed on side information having at least quantization step size information and quantization bit information allotted to each band, by a predetermined coding method.

The digits in the steps (e) and (f) in one embodiment, and the coding in the step (f) can be performed by coupling bits composing the bit sequences into units of bits of a predetermined in this embodiment.

The predetermined coding method preferably is lossless coding and the lossless coding is Huffman coding preferably or Arithmetic coding.

When the quantized data is composed of sign data and magnitude data, the step (f), preferably comprises the steps of: i) coding the most significant digit sequences composed of most significant digits of the magnitude data composing the represented digital data by a predetermined coding method; ii) coding sign data corresponding to non-zero data among the coded most significant digit sequences; iii) coding the most significant digit sequences among uncoded magnitude data of the digital data by a predetermined coding method; iv) coding uncoded sign data among the sign data corresponding to non-zero magnitude data among digit sequences coded in the step (iii); and v) performing the steps (iii) and (iv) on the respective digits of the digital data.

The step (e) is to represent the digital data as binary data having bits in one embodiment of invention of the same number, and the digits are bits.

The coding steps are performed by coupling bits composing the respective bit sequences for the magnitude data and sign data, into units of bits of a predetermined number in one embodiment of the invention.

The quantization is performed by the steps of converting the input audio signals of a temporal domain into signals of a frequency domain, coupling the converted signals as signals of predetermined subbands by-time/frequency mapping and calculating a masking threshold at each subband, and quantizing the signals for each predetermined coding band so that quantization noise of each band is smaller than the masking threshold.

According to another aspect of the present invention,. there is provided a scalable audio coding apparatus for coding audio signals to have layered bitrate data of a predetermined number, comprising: a quantizing portion for signal-processing input audio signals and quantizing the same for each coding band; and a bit packing portion for generating bitstreams by. coding side information corresponding to a base layer and the quantized data, and coding side information corresponding to the next layer of the base layer and the quantized data, to perform coding on all layers, wherein the bit packing portion performs the coding by representing the quantized data by binary data having bits of a predetermined same number to slice the same into units of bits, and coding the bit-sliced data from the most significant bit sequence to the least significant bit sequence, by a predetermined coding method.

When digital data is composed of sign data and magnitude data, the bit packing portion collects and codes the magnitude data for the bits having the same significance level among the bit-sliced data, codes uncoded sign data among the sign data corresponding to non-zero magnitude data, the magnitude and sign data coding is performed sequentially from the MSBs to lower significant bits in one embodiment.

When the bit packing portion collects and codes the bits according to significance, coding is performed by coupling the bits in a predetermined number unit in one embodiment.

Also, there is provided a scalable audio decoding method for decoding audio data coded to have layered bitrates, comprising the steps of: decoding side information having at least quantization step size information and quantization bit information allotted to each band, in the order of creation of the layers in datastreams having layered bitrates, by analyzing the significance of bits composing the datastreams, from upper significant bits to lower significant bits; restoring the decoded quantization step size and quantized data into signals having the original magnitudes; and converting inversely quantized signals into signals of a temporal domain.

The digits in the decoding step are bits, and the datastreams are bitstreams in this embodiment.

The decoding step according to significance is performed in units of vectors comprised of bits of a predetermined number in the embodiment.

When the quantized data is composed of sign data and magnitude data, the decoding step may be performed by: decoding side information having at least quantization step size information and quantization bit information allotted to each band, and the quantized data, in the order of creation of layers in datastreams having layered bitrates, by analyzing the significance of bits composing the datastreams, from upper significant bits to lower significant bits; and decoding the sign. data of the quantized data and combining the same with the decoded magnitude data.

The decoding in one embodiment step is performed by Arithmetic decoding or Huffman decoding.

Alternatively, according to the present invention, there is provided a scalable audio decoding apparatus for decoding audio data coded to have layered bitrates, comprising: a bitstream analyzing portion for decoding side information having at least quantization step size information and quantization bit information allotted to each band, and the quantized data, in the order of creation of the layers in layered bitstreams, by analyzing the significance of bits composing the bitstreams, from upper significant bits to lower significant bits; an inverse quantizing portion for restoring the decoded quantization step size and quantized data into signals having the original magnitudes; and a frequency/time mapping portion for converting inversely quantized signals into signals of a temporal domain.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT(S)

Hereinbelow, preferred embodiments of the present invention will be described in detail with reference to accompanying drawings.

Figure 1:
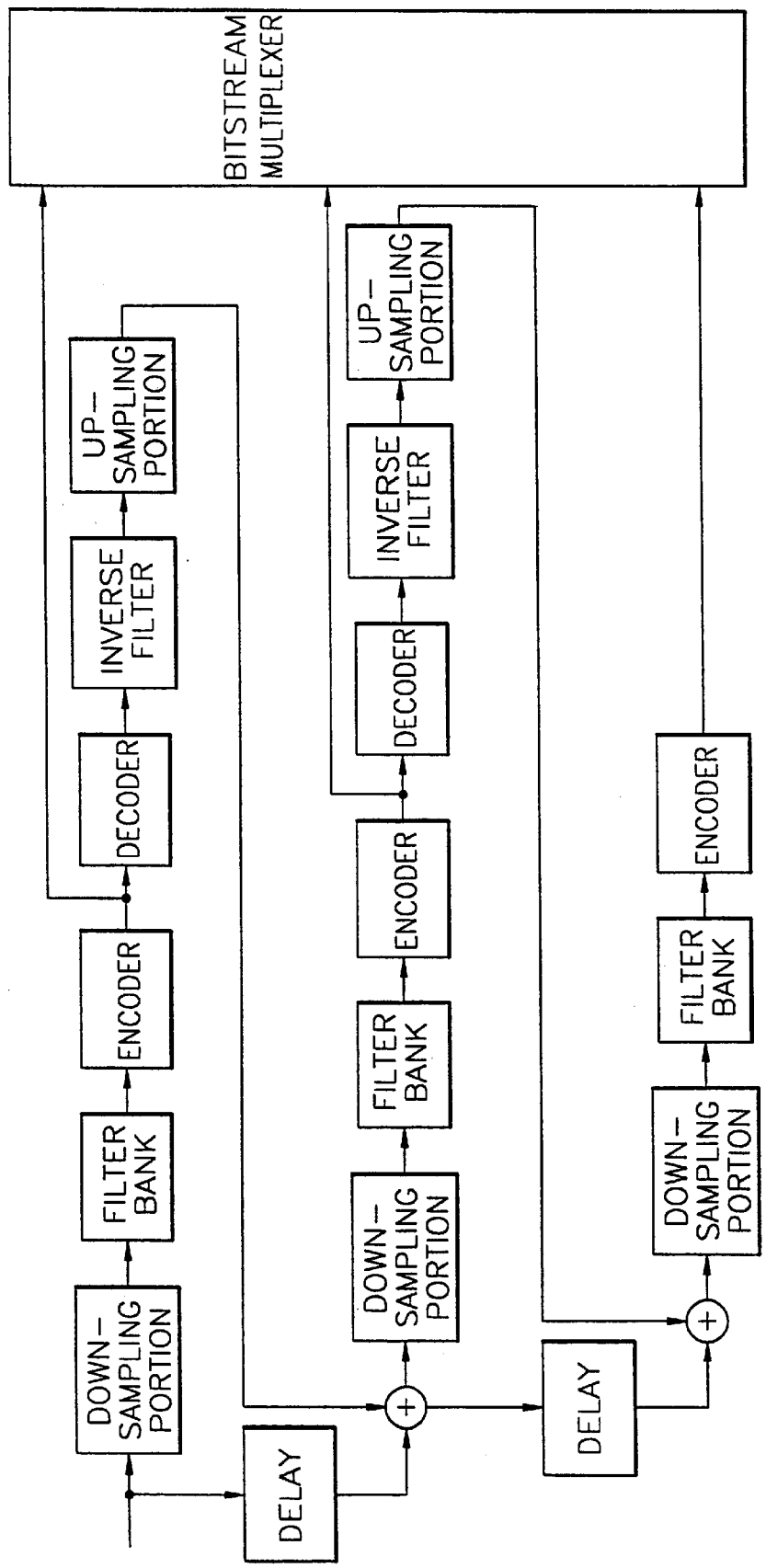
FIG. 1 is a block diagram of a simple scalable coding/decoding apparatus (codec)
Figure 2:
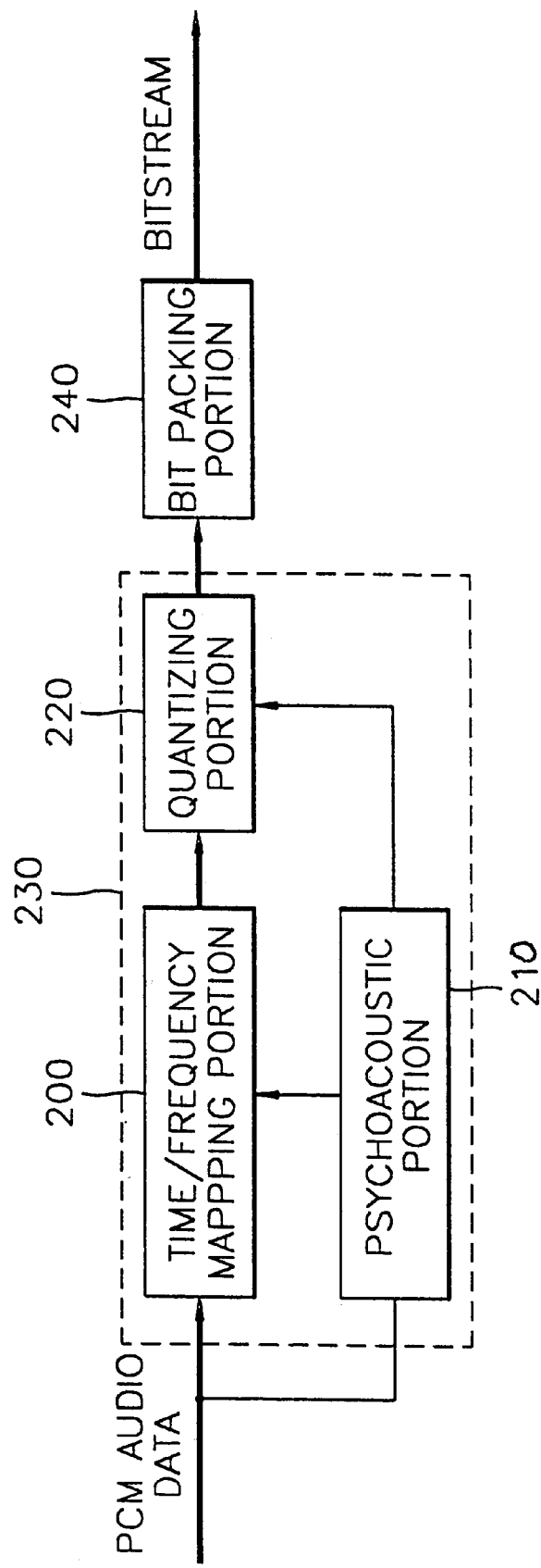
FIG. 2 is a block diagram of a coding apparatus according to the present invention.

FIG. 2 is a block diagram of a scalable audio coding apparatus according to the present invention, which includes a quantizer 230 and a bit packing portion 240.

The quantizing portion 230 for signal-processing input audio signals and quantizing the same for a predetermined coding band, includes a time/frequency mapping portion 200, a psychoacoustic portion 210 and a quantizing portion 220. The time/frequency mapping portion 200 converts the input audio signals of a temporal domain into signals of a frequency domain. A perceived difference between signal characteristics by the human ear is not very large temporally. However, according to the human psychoacoustic models, a big difference is produced for each band. Thus, compression efficiency can be enhanced by allotting different quantization bits depending on frequency bands.

The psychoacoustic portion 210 couples the converted signals by signals of predetermined subbands by the time/frequency mapping portion 200 and calculates a masking threshold at each subband using a masking phenomenon generated by interaction with the respective signals.

The quantizing portion 220 quantizes the signals for each predetermined coding band so that the quantization noise of each band becomes smaller than the masking threshold. In other words, the frequency signals of each band are applied Lo scala quantization so that the magnitude of the quantization noise of each band is smaller than the masking threshold, so as to be imperceptible. Quantization is performed so that NMR (Noise-to-Mask Ratio) value, which is a ratio of the masking threshold calculated by the psychoacoustic portion 210 to the noise generated at each band, is less than or equal to 0 dB. The NMR value less than or equal to 0 dB means that the masking threshold is higher than the quantization noise. In other words, the quantization noise is not audible.

The bit packing portion 240 codes side information corresponding to a base layer having the lowest bitrate and the quantized data, successively codes side information corresponding to the next layer of the base layer and the quantized data, and performs this procedure for all layers, to generate bitstreams. Coding the quantized data of the respective layers is performed by the steps of slicing each quantized data into units of bits by representing the same as binary data comprised of bits of a predetermined same number, and coding the bit-sliced data sequentially from the most significant bit sequence to the least significant bit sequence, by a predetermined coding method. When the digital data is composed of sign data and magnitude data, the bit packing portion 240 collects each magnitude data for the bits having the same significance level among the bit-sliced data, codes the same, ancodes codes the sign data corresponding to non-zero magnitude data among the coded magnitude data. Here, the coding procedure for the sign data and the magnitude data are performed sequentially from the MSBs to the lower significant bits.

Now, the operation of the coding apparatus will be described. Input audio signals are coded and generated as bitstreams. To this end, the input signals are converted to signals of a frequency domain by MDCT (Modified Discrete Cosine Transform) or subband filtering in the time/frequency mapping portion 200. The psychoacoustic portion 210 couples the frequency signals by appropriate subbands to obtain a masking threshold. The subbands are mainly used for quantization and thus called quantization bands. The quantizing portion 220 performs scala quantization so that the magnitude of the quantization noise of each quantization band is smaller than the masking threshold, which is audible but is not perceivable. If quantization fulfilling such conditions is performed, quantization step size values for the respective bands and quantized frequency values are generated.

In view of the human psychoacoustics, close frequency components can be easily perceived at a lower frequency. However, as the frequency increases, the interval of perceivable frequencies becomes wider. As demonstrated in Table 1, the quantization band of the lower frequency has a narrow bandwidth and that of the-higher frequency has a wide bandwidth.

TABLE 1

| Quantization band | Coding band | Start index | End index |
| --- | --- | --- | --- |
| 0 | 0 | 0 | 7 |
| 1 |   | 8 | 15 |
| 2 |   | 16 | 23 |
| 3 | 1 | 24 | 35 |
| 4 |   | 36 | 47 |
| 5 | 2 | 48 | 59 |
| 6 |   | 60 | 71 |
| 7 | 3 | 72 | 83 |
| 8 |   | 84 | 99 |
| 9 | 4 | 100 | 115 |
| 10 |   | 116 | 131 |
| 11 | 5 | 132 | 147 |
| 12 |   | 148 | 163 |
| 13 | 6 | 164 | 195 |
| 14 | 7 | 196 | 227 |
| 15 | 8 | 228 | 259 |
| 16 | 9 | 260 | 291 |
| 17 | 10 | 292 | 323 |
| 18 | 11 | 324 | 354 |
| 19 | 12 | 356 | 387 |
| 20 | 13 | 388 | 419 |
| 21 | 14 | 420 | 451 |

TABLE 1-continued

| Quantization band | Coding band | Start index | End index |
|---|---|---|---|
| 22 | 15 | 452 | 483 |
| 23 | 16 | 484 | 515 |
| 24 | 17 | 516 | 555 |
| 25 | 18 | 556 | 599 |
| 26 | 19 | 600 | 634 |
| 27 | 20 | 644 | 687 |

However, to facilitate coding, the quantization bands indicated in Table 1 are not used for coding, but coding bands having similar bandwidths to those of the quantization bands are used instead. In other words, as demonstrated in Table 1, in the case of narrow bandwidths, several quantization bands are coupled to produce a coding band. In the case of broad bandwidths, one quantization band makes up one coding band. Therefore, the all coding bands are controlled to have a similar magnitude.

1. Coding depending on significance of data

The sign values of the quantized values are stored separately and the absolute values thereof is taken to obtain data represented as positive values. Among the quantized frequency values of each coding band, a value having a large absolute value is searched for and the number of quantization bits necessary for representing signals for each band is calculated.

Generally, the significance of a 1-bit MSB (most significant bit) is far greater than that of a 1-bit LSB (least significant bit). However, according to the conventional method, coding is performed irrespective of significance. Thus, if only some bitstreams from the forehand bitstreams among all bitstreams are to be used, the information less important than the information included in the unused backhand bitstreams is considerably included in the forehand bitstreams.

By the foregoing reason, in the present invention, quantized signals of the respective bands are coded sequentially from the MSBs to the LSBs. In other words, the respective quantized signals are represented by binary notation, and the quantized values of the respective frequency components are sequentially processed in units of bits, from low frequency components to high frequency components. First, the MSEs of the respective frequency components are obtained, and then the next upper significant bits are coded sequentially by one bit, up to the LSBs. In such a manner, more important information is coded first so that bitstreams are generated from the forehand.

It is assumed that 8 quantized values each having 4 bits are represented by binary notation as follows:

```
     LSB   MSB
      ↓     ↓
0:  1  0  0  1
1:  1  0  0  0
2:  0  1  0  1
3:  0  0  1  0
4:  0  0  0  0
5:  1  0  0  0
6:  0  0  0  0
7:  0  1  0  0
```

Conventionally, 1001 of the lowest frequency component is coded and then 1000, 0101, 0010 are sequentially coded (that is, horizontally for each frequency component). However, according to the present. invention, 1, the MSB of the lowest frequency component, and 0, 1, 0, 0, . . . the MSBs of other frequency components, are processed sequentially, by being coupled by several bits. For example, in the case of coding in units of 4 bits, 1010 is coded and then 0000 is coded. If the coding of the MSBs is completed, the next upper significant bit values are obtained to then be coded in the order of 0001, 0010, . . . , up to the LSBs. Here, the coding method can be lossless coding such as Huffman coding or Arithmetic coding.

2. Coding including sign bit

Generally, a sign bit is the MSB. Thus, when coding is performed from the MSB, the sign bit is regarded as the most important information and is coded. In this case, inefficient coding may be caused. In other words, since the values quantized from the MSB to the first upper bit being 1 are regarded as zero, the sign values thereof are meaningless. For example, if a quantized value is represented by 5 bits of 00011 and only 3 upper bits are used in coding, the quantized value is restored as 00000. Therefore, even if this value has a sign bit, the information is useless. However, if 4 bits among 5 bits are used, the quantized value becomes 00010. Thus, the sign value becomes considerably more meaningful because the value of 1 which comes first in upper bits means that the quantized value is decoded to a value other than zero.

In representing respective frequency components from respective MSBs, if 1 rather than 0 comes first, the sign value is coded prior to coding another value, depending on whether the sign value is positive or negative. For example, in coding the MSB, 1010 is coded first and then it is determined whether it is necessary to code the sign bit. At this time, since a non-zero value is coded first in the first and third-frequency components, the sign bits for these two components are sequentially coded to then code 0000. To code the LSBs, 1100 is coded and then it is determined whether the sign bit is necessary. In this case, the first one of two 1's has already come in the MSB, which means that the sign bit has been coded. Thus, it is not necessary to code the sign bit. However, since the second of two 1's does not appear in the upper bits, the sign bit is coded. After coding the sign bit, 0100 the LSBs is coded.

3. Improved coding method

In applying the above-described coding method, in the case of a low bitrate, it is more effective to change the coding order as follows. Generally, the human auditory system is very sensitive to the frequency components in the contour of either positive or negative. In the coding method proposed herein, only the frequency components having uncoded sign bits to be restored as 0 are coded, while coding of the frequency components whose sign bits are coded are deferred. After completely coding the sign bits in such a manner, the deferred data are coded by the above-described coding method, which will be described in detail using the aforementioned example.

First, since there is no frequency component having a coded sign bit among the MSBs, the MSBs are all coded. The next-upper significant bits are 0001, 0000, . . . Here, for 0001, the first 0 and the third 0 are not coded because the sign bits are already coded in the MSBs, and then the second and fourth bits 0 and 1 are coded. Here, since there is no 1 among the upper bits, the sign bit for the frequency component of the fourth bit 1 is coded. For 0000, since there has no coded sign bit among the upper bits, these four bits are all coded. In such a manner, sign bits are coded up to the LSBs, and then the remaining uncoded information is coded sequentially from the upper significant bits using the aforementioned coding method.

4. Formation of scalable bitstreams

In the present invention, audio signals are coded as layered bitstreams comprised of a base layer and several enhancement layers. The base layer has, the lowest bitrate, and the enhancement layers have a higher bitrate than that of the base layer. The upper enhancement layers have higher bitrates than lower ones.

Only the MSBs are represented in the forehand of the base layer, so that only the contour for the all frequency components is coded. As more bits are represented in lower bits, more detailed information can be expressed. Since detail information data values are coded according to increasing bitrates, i.e., enhancement of layers, and audio quality can be improved.

The method for forming scalable bitstreams using such represented data will now be described. First, among side information to be used for the base layer, quantization bit information for each quantizing band is coded. The information of quantized values is sequentially coded from the MSBs to the LSBs, and from low frequency components to high frequency components. If quantization bits of a certain band are less than those of the band being currently coded, coding is not performed. When quantization bits of the band equal to those of the band being currently coded, coding is performed. Here, if there is no band restriction in coding signals of the respective layers, sound objectionable to the ear may be generated. This is because signals are on and off when restoring signals of the layers having low bitrates, in the case of performing coding from the MSB to the LSB, irrespective of bands. Thus, it is advisable to restrict bands appropriately according to bitrates.

After the base layer is coded, the side information and quantized value of audio data for the next enhancement layer a re coded. In such a manner, data of all layers are coded. The thus-coded information is collected altogether to form bitstreams.

Figure 3:
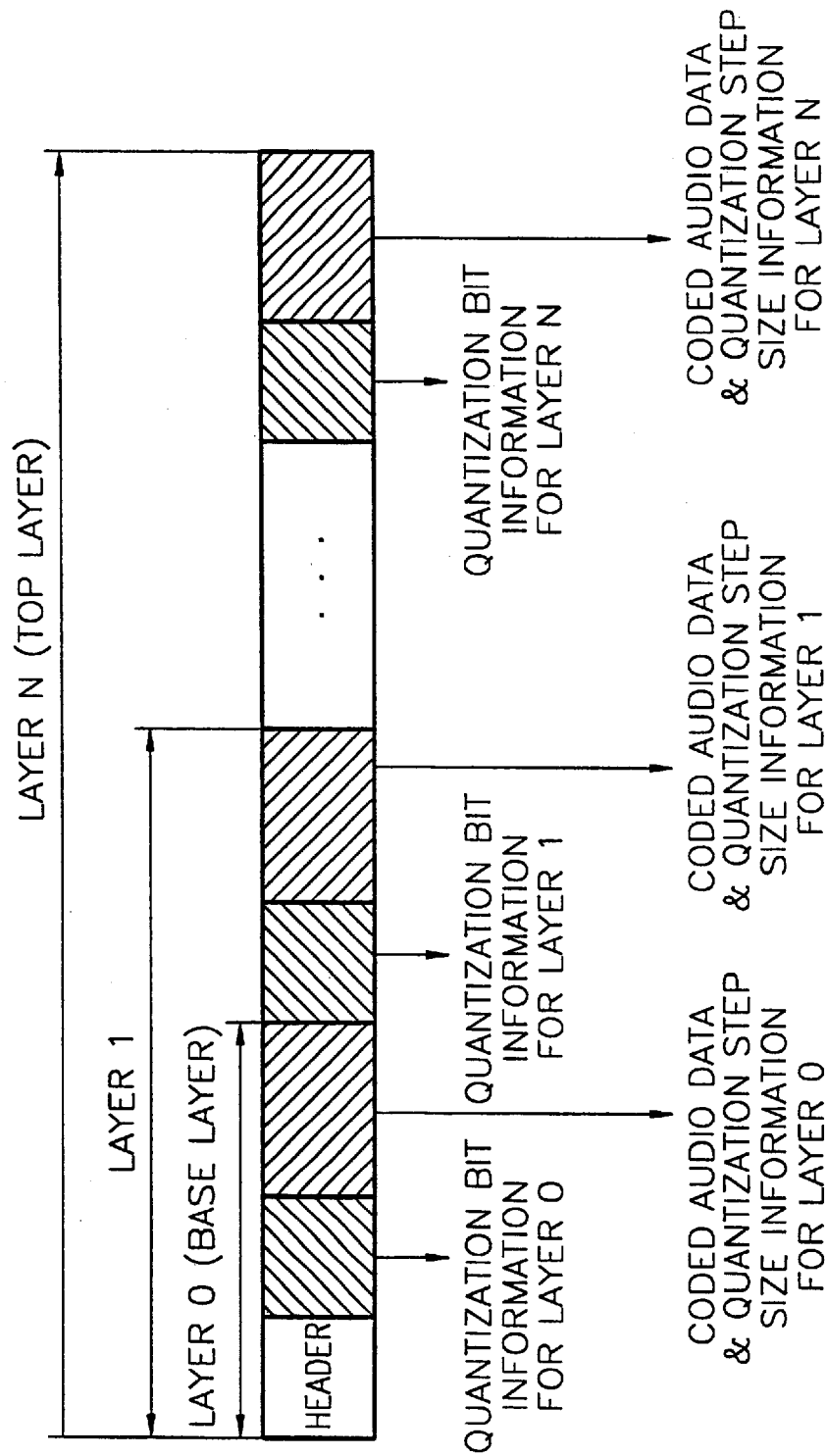
FIG. 3 shows the structure of a bitstream according to the present invention.

As described above, t he bitstreams formed by the coding apparatus, have a layered structure in which the bitstreams of lower bitrate layers are contained in those of higher bitrate layers, as shown in FIG. 3. Conventionally, side information is coded first and then the remaining information is coded to form bitstreams. However, in the present invention, as shown in FIG. 3, the side information for each layer is separately coded. Also, although all quantized data are sequentially coded in units of samples conventionally, in the present invention, quantized data is represented by binary data and is coded from the MSB of the binary data to form bitstreams within the bit quantity allowance.

The operation of the coding apparatus will now be described in more detail. In the present invention, the information for the bitrates of various layers is coded within a bitstream, with a layer ed structure, as shown in FIG. 3, from more important signal components. Using the thus-formed bitstreams, bitstreams having a low bitrate can be formed by simply rearranging the low bitrate bitstreams contained in the bitstream having the highest bitstream, by a user's request or according to the state of transmission channels. In other words, bitstreams formed by a coding apparatus on a real time basis, or bitstreams stored in a medium, can be rearranged to be suitable for a desired bitrate by a user's request, to then be transmitted. Also, if the user's hardware performance is poor or the user wants to reduce the complexity of a decoder, even with appropriate bitstreams, only some bitstreams can be restored, thereby controlling the complexity.

For example, in forming a scalable bitstream, the bitrate of a base layer is 16 Kbps, that of a top layer is 64 Kbps, and the respective enhancement layers has a bitrate interval of 8 Kbps, that is, the bitstream has 7 layers of 16, 24, 32, 40, 48, 56 and 64 Kbps. Since the bitstream formed by the coding apparatus has a layered structure, as shown in FIG. 3, the bitstream of the top layer of 64 Kbps contains the bitstreams of the respective enhancement layers (16, 24, 32, 40, 48, 56 and 64 Kbps). If a user requests data for the top layer, the bitstream for the top layer is transmitted without any processing therefore. Also, if another user requests data for the base layer (corresponding to 16 Kbps), only the forehand bitstreams are simply transmitted.

The respective layers have limited bandwidths according to bitrates, as demonstrated in Table 4, and the end quantization bands are different. Input data is a PCM data sampled at 48 KHz, and the magnitude of one frame is 1024. The number of bits usable for one frame for a bitrate of 64-Kbps is 1365.3333 (=64000 bits/sec*(1024/48000)) on the average.

TABLE 2

| Bitrate (Kbps) | 16 | 24 | 32 | 40 | 48 | 56 | 64 |
|---|---|---|---|---|---|---|---|
| Limited band (long block) | 0–12 | 0–19 | 0–21 | 0–23 | 0–25 | 0–27 | 0–27 |
| Limited band (short block) | 0–4 | 0–7 | 0–8 | 0–9 | 0–10 | 0–11 | 0–11 |
| Bandwidth | 4 KHz | 8 KHz | 10 KHz | 12 KHz | 14 KHz | 16 KHz | 16 KHz |

Similarly, the number of bits usable for one frame can be Scalculated according to the respective bitrates, as demonstrated in Table 3.

TABLE 3

| Bitrate (Kbps) | 16 | 24 | 32 | 40 | 48 | 56 | 64 |
|---|---|---|---|---|---|---|---|
| Bits/frame | 336 | 512 | 680 | 848 | 1024 | 1192 | 1365 |

Prior to quantization, using a psychoacoustic model, the block type of a frame being currently processed (long, start, short, or-stop), the SMR values of the respective processing bands, section information of a short block and temporally delayed PCM data for time/frequency synchronization with the psychoacoustic model, are first generated from input data, and transmitted to a time/frequency mapping portion. ISO/IEC 11172-3 Model 2 is employed for calculating the psychoacoustic model.

The time/frequency mapping portion converts data of a temporal domain into data of a frequency domain using MDCT according to the block type output using the psychoacoustic model. At this time, the block sizes are 2048 and 256 in the case of long/start/stop blocks and in the case of a short block, respectively,.and MDCT is performed 8 times.

The same procedure as that used in the conventional MPEG-2 NBC [13] has been used heretofore.

The data converted into that of a frequency domain is quantized with an increasing step size so that the SNR value of the quantizing band shown in Table 1 is smaller than the SMR as the output value of the psychoacoustic model. Here, scala quantization is performed, and the basic quantization step size is 2¼. Quantization is performed so that NMR is equal to or less than 0 dB. Here, the obtained output is information for the quantization step sizes for the respective processing bands. To code the quantized signals, the absolute values thereof are searched for the respective coding bands and then the largest quantization bit necessary for coding is calculated.

For synchronization signals of the bitstreams, 12 bits are added to the bitstreams to produce information for the start of the bitstreams. Then, the magnitude of all bitstreams is coded. The information for the highest bitrate bitstream among the coded bitstreams is coded. This information is used in producing lower bitrate bitstreams. When a higher bitrate is requested, no further bit may be transmitted. Next, a block type must be coded. The subsequent coding process may be slightly different depending on the type of the block. To code input signals of a frame, according to signal characteristics, a long block may be converted, or 8 shorter blocks may be converted. Since the block size is changed in such away, coding becomes slightly different.

First, in the case of a long block, since the bandwidth of the base layer is 4 KHz, the processing bands range to the 12th quantizing band. Now, the maximum quantization bit value is obtained from the bit information allotted to each coding band and coding is performed from the maximum quantization bit value by the aforementioned coding method. Then, the next quantized bits are sequentially coded. If quantization bits of a certain band are less than those of the band being currently coded, coding is not performed. When quantization bits of the band equal to those of the band being currently coded, coding is performed. When coding a band for the first time, quantization step size information of the quantization band is coded and then the values corresponding to the quantization bits of, the quantized frequency components are sampled to then be coded. Since the bitrate of the bottom layer is 16 Kbps, the entire bit allowance is 336 bits. Thus, the total-used bit quantity is calculated continuously and coding is terminated at the moment the bit quantity exceeds 336. To code the quantization bit or quantization step size information, the minimum and maximum values of the quantization bit or quantization step size are obtained to then obtain the difference between these two values, thereby. obtaining the number of necessary bits. In practice, prior to coding the side information, the minimum value and the magnitude necessary for representing bits are first coded by arithmetic coding and then stored in the bitstreams. When coding is actually performed later, the difference between the minimum value and side information is coded. Then, the next quantized signals are sequentially coded.

Similarly, 8 short blocks produced by dividing a long block, having a magnitude one eighths that of the long block, undergo time/frequency mapping and quantization and then lossless coding is performed on the quantized data. Here, the quantization is not performed separately on each of the 8 blocks. Instead, using the information sent from the psychoacoustic portion for 8 blocks separated into 3 sections, the quantization bands in these sections, as demonstrated in Table 4, are collected, to then be processed just like one band, in the long block. Thus, the quantization step size information for each band in these three sections can be obtained. To conform the bandwidth of the base layer to that for the long block, the bands are restricted to those ranging up to the fourth one. Since the short block has 8 subblocks, as demonstrated in Table 4, one subblock is divided into coding bands in units of 4 samples. The coding bands of 8 subblocks are coupled and the quantization bit information is obtained from the 32 quantized signals. First, the quantization bit information within the restricted band is coded. Then, the maximum quantization bit is obtained in the band-restricted components, and coding is performed, by the above-described coding method, as in the long block. If the quantization bit of a certain band is smaller than that being currently coded, coding is not performed. When the quantization bit of a certain band becomes equal to that being currently coded, coding is performed. When a band is coded, the step size information for the quantization band is coded first and then the values corresponding to the quantization bits among the quantized frequency components are sampled to then be coded.

TABLE 4

| Coding band | Quantization band | Start index | End index |
| --- | --- | --- | --- |
| 0 | 0 | 0 | 3 |
| 1 | 1 | 4 | 7 |
| 2 | 2 | 8 | 11 |
| 3 | 3 | 12 | 15 |
| 4 | 4 | 16 | 19 |
| 5 | 5 | 20 | 23 |
| 6 | 6 | 24 | 27 |
| 7 |  | 28 | 31 |
| 8 | 7 | 32 | 35 |
| 9 |  | 36 | 39 |
| 10 | 8 | 40 | 43 |
| 11 |  | 44 | 47 |
| 12 | 9 | 48 | 51 |
| 13 |  | 52 | 55 |
| 14 |  | 56 | 59 |
| 15 | 10 | 60 | 63 |
| 16 |  | 64 | 67 |
| 17 |  | 68 | 71 |
| 18 | 11 | 72 | 75 |
| 19 |  | 76 | 79 |
| 20 |  | 80 | 83 |
| 21 |  | 84 | 87 |

After all bitstreams for the base layer (16 Kbps) are formed, the bitstreams for the next layer (24 Kbps) are formed. Since the bandwidth of the layer of 24 Kbps is 8 KHz, the frequency components up to the 19th bands are coded. Since the side information for up to the 19th bands is already recorded, only the side information for the 13th through 19th bands is recorded. In the bottom layer, uncoded quantization bits for each band and the quantization bits of a newly added band are compared to obtain the maximum quantization bit. Coding is performed from the maximum quantization bit in the same manner as in the base layer. When the total used bit quantity is larger than the usable bit quantity at 24 Kbps, coding is terminated and preparation for forming the next layer bitstreams is made. In this manner, bitstreams for the remaining layers of 32, 40, 48, 56 and 64 Kbps can be generated. The thus-formed bitstreams will have the same structure as shown in FIG. 3.

Figure 4:
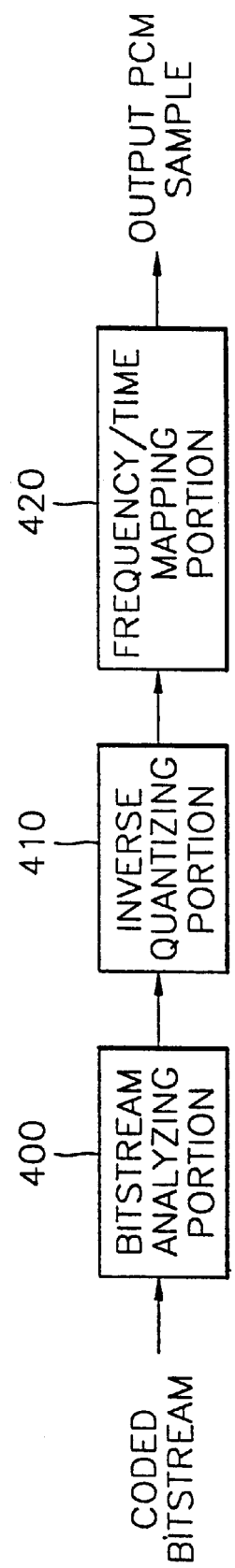
FIG. 4 is a block diagram of a decoding apparatus according to the present invention.

Now, a decoding apparatus for decoding bitstreams generated by the coding apparatus will be described in detail. FIG. 4 is a block diagram of the decoding apparatus, which includes a bitstream analyzing portion 400, an inverse quantizing portion 410, and a frequency/time mapping portion 420.

The bitstream analyzing portion 400 decodes side information having at least quantization bits and quantization step size, and quantized data, in the order of generation of the bitstreams having a layered structure, from upper significant bits to lower significant bits, for the respective layers, by analyzing the significance of bits composing the bitstreams. The inverse quantizing portion 410 restores the decoded quantization step size and quantized data into signals having the original magnitudes. The frequency/time mapping portion 420 converts. inversely quantized signals into signals of a temporal domain so as to be reproduced by a user.

Next, the operation of the decoding apparatus will be described. The order of decoding the bitstreams generated by the coding apparatus is reverse to the coding order. The decoding process will be briefly described. First, among the side information of the base layer, the quantization bit information of each quantizing band is decoded. Among the decoded quantization bits, the maximum value is obtained. The quantized values are decoded sequentially from the MSBs to the; LSBs, and from low frequency components to high frequency components, as in the coding process. If the quantization bit of a certain band is smaller than that being currently decoded, decoding is not performed. When the quantization bit of a certain band becomes equal to that being currently decoded, decoding is performed. When signals of a certain quantizing band is first decoded in the course of decoding the quantized values, since the step size information for the quantization band is stored in the bitstream, the information for the same-is first coded and then the values corresponding to the quantization bits are continuously coded.

After completing decoding of the bitstreams for base layer, the side information and quantized values of audio data for the next layer are decoded. In such a manner, data of all layers can be decoded. The data quantized through the decoding process is restored as the original signals through the inverse quantizing portion 410 and-the frequency/time mapping portion 420 shown in FIG. 4, in the reverse order of the coding. The invention may be embodied in a general purpose digital computer that is running a program or program segments originating from a computer readable or usable medium, such medium including but not limited to magnetic storage media (e.g., ROM's, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

As described above, according to the present invention, to satisfy various users' request, flexible bitstreams are formed. In other words, by the users' request, the information for the bitrates of various layers is combined with one bitstream without overlapping, thereby providing bitstreams having good audio quality. Also, no converter is necessary between a transmitting terminal and a receiving terminal. Further, any state of transmission channels and various users, request can be accommodated.

Since the bitstreams are scalable, one bitstream may contain various bitstreams having several bitrates. Thus, bitstreams of various layers can be generated simply. Also, in the present invention, after quantization is performed once so that NMR is less than or equal to 0 dB, no further bit controller is necessary. Thus, the coding apparatus is not complex.

Also, since coding is performed according to significance of quantization bits, instead of performing coding after processing the difference between quantized signals of the previous layer and the original signal, for each layer, the complexity of the coding apparatus is reduced.

Further, since the side information for the respective bands is used just once throughout the entire bitstreams, audio quality can be improved. If the bitrate is lowered, due to limited bands, the complexity of a filter, which is a major source of the complex coding and decoding, is considerably reduced. Accordingly, the complexity of a coding and decoding apparatus is reduced. Also, according to the performance of users' decoders and bandwidth/congestion of transmission channels or by the users' request, the bitrates or the complexity can be controlled.

What is claimed is:

1. A scalable audio coding apparatus for coding audio signals to have layered bitrate data of a predetermined number, comprising:

a quantizing portion for signal-processing input audio signals and directly quantizing the same for each coding band; and a bit packing portion for generating bitstreams by coding side information corresponding to a base layer and sliced digits of the quantized data, and coding side information corresponding to the next layer of the base layer and uncoded sliced digits of the quantized data, to perform coding on all layers, wherein the bit packing portion performs the coding by representing the quantized data by binary data having bits of a predetermined number to slice the same into units of bits, and coding the bit-sliced data from the most significant bit sequence to the least significant bit sequence, by a predetermined coding method.

2. The scalable audio coding apparatus according to claim 1, wherein, when side information data is composed of sign data and magnitude data, the bit packing portion collects and codes the magnitude data for the bits having the same significance level among the bit-sliced data, codes uncoded sign data among the sign data corresponding to non-zero magnitude data, the magnitude and sign data coding is performed sequentially from the MSBs to lower significant bits.

3. The scalable audio coding apparatus according to claim 2, wherein, when the bit packing portion collects and codes the bits according to significance, coding is performed by coupling the bits in a predetermined number unit.

4. The scalable audio coding apparatus according to claim 2, wherein the bit packing portion performs coding by either Huffman coding or Arithmetic coding.

5. The scalable audio coding apparatus according to claim 2, wherein the bit packing portion performs coding sequentially from low frequency components to high frequency components.

6. The scalable audio coding apparatus according to claim 2, wherein the quantizing portion comprises:

a time/frequency mapping portion for converting the input audio signals of a temporal domain into signals of a frequency domain.

7. The scalable audio coding apparatus according to claim 2, wherein the quantizing portion comprises:

a psychoacoustic portion for coupling the converted signals by signals of predetermined subbands by time/frequency mapping and calculating a masking threshold at each subband; and a quantizing portion for quantizing the signals for each predetermined coding band so that quantization noise of each band is smaller than the masking threshold.

8. The scalable audio coding apparatus according to claim 1, wherein, when the bit packing portion codes the bits according to significance, coding is performed by coupling the bits in a predetermined number unit.

9. The scalable audio coding apparatus according to claim 1, wherein the bit packing portion performs coding by either Huffman coding or Arithmetic coding.

10. The scalable audio coding apparatus according to claim 1, wherein the bit packing portion performs coding sequentially from low frequency components to high frequency components.

11. The scalable audio coding apparatus according to claim 1, wherein the quantizing portion comprises:

a time/frequency mapping portion for converting the input audio signals of a temporal domain into signals of a frequency domain.

12. The scalable audio coding apparatus according to claim 11, wherein the quantizing portion comprises:

a psychoacoustic portion for coupling the converted signals by signals of predetermined subbands by time/frequency mapping and calculating a masking threshold at each subband; and a quantizing portion for quantizing the signals for each predetermined coding band so that quantization noise of each band is smaller than the masking threshold.

13. A scalable audio decoding method for decoding audio data coded to have layered bitrates, comprising the steps of:

decoding side information having at least quantization step size information and quantization bit information allotted to each band, in the order of creation of the layers in datastreams having layered bitrates, by analyzing the significance of bits composing the datastreams, from upper significant bits to lower significant bits;

restoring the decoded quantization step size and quantized data into signals having the original magnitudes; and converting inversely quantized signals into signals of a temporal domain.

14. The scalable audio decoding method according to claim 13, wherein the digits in the decoding step are bits, and the datastreams are bitstreams.

15. The scalable audio decoding method according to claim 14, wherein, when the quantized data is composed of sign data and magnitude data, the decoding step is performed by:

decoding side information having at least quantization step size information and quantization bit information allotted to each band, and the quantized data, in the order of creation of layers in datastreams having layered bitrates, by analyzing the significance of bits composing the datastreams, from upper significant bits to lower significant bits; and decoding the sign data of the quantized data and combining the same with the decoded magnitude data.

16. The scalable audio decoding method according to claim 14, wherein the decoding step is performed by Arithmetic decoding.

17. The scalable audio decoding method according to claim 14, wherein the decoding step is performed by Huffman decoding.

18. The scalable audio decoding method according to claim 14, wherein the decoding step according to significance is performed in units of vectors comprised of bits of a predetermined number.

19. The scalable audio decoding method according to claim 18, wherein, when the quantized data is composed of sign data and magnitude data, the decoding step is performed by:

decoding side information having at least quantization step size information and quantization bit information allotted to each band, and the quantized data, in the order of creation of layers in datastreams having layered bitrates, by analyzing the significance of bits composing the datastreams, from upper significant bits to lower significant bits; and decoding the sign data of the quantized data and combining the same with the decoded magnitude data.

20. A scalable audio decoding apparatus for decoding audio data coded to have layered bitrates, comprising:

a bitstream analyzing portion for decoding side information having at least quantization step size information and quantization bit information allotted to each band, and the quantized data, in the order of creation of the layers in layered bitstreams, by analyzing the significance of bits composing the bitstreams, from upper significant bits to lower significant bits;

an inverse quantizing portion for restoring the decoded quantization step size and quantized data into signals having the original magnitudes; and a frequency/time mapping portion for converting inversely quantized signals into signals of a temporal domain.

* * * * *